US009166887B2

(12) United States Patent  
Allan et al.

(10) Patent No.: US 9,166,887 B2
(45) Date of Patent: Oct. 20, 2015

(54) MULTICAST CONVERGENCE

(71) Applicant: Telefonaktiebolaget L M Ericsson (publ), Stockholm (SE)

(72) Inventors: David Ian Allan, San Jose, CA (US); János Farkas, Kecskemét (HU)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 155 days.

(21) Appl. No.: 14/141,120

(22) Filed: Dec. 26, 2013

(65) Prior Publication Data

US 2015/0188771 A1  Jul. 2, 2015

(51) Int. Cl.
- *H04L 12/753* (2013.01)
- *H04L 12/759* (2013.01)
- *H04L 12/24* (2006.01)
- *H04L 12/18* (2006.01)
- *H04L 12/733* (2013.01)
- *H04L 12/761* (2013.01)
- *H04L 12/703* (2013.01)

(52) U.S. Cl.
CPC ............ *H04L 41/12* (2013.01); *H04L 12/185* (2013.01); *H04L 41/0668* (2013.01); *H04L 41/0816* (2013.01); *H04L 41/0836* (2013.01); *H04L 45/028* (2013.01); *H04L 45/122* (2013.01); *H04L 45/16* (2013.01); *H04L 45/28* (2013.01); *H04L 45/48* (2013.01)

(58) Field of Classification Search
None
See application file for complete search history.

(56) References Cited

U.S. PATENT DOCUMENTS

| | | |
|---|---|---|
| 7,136,357 B2 | 11/2006 | Soumiya et al. |
| 8,553,562 B2 | 10/2013 | Allan et al. |
| 8,553,584 B2 | 10/2013 | Allan et al. |
| 2006/0198323 A1 | 9/2006 | Finn |
| 2007/0002770 A1 | 1/2007 | Haalen et al. |
| 2008/0159277 A1 | 7/2008 | Vobbilisetty et al. |
| 2009/0168768 A1 | 7/2009 | Chiabaut et al. |
| 2009/0234969 A1 | 9/2009 | Mohan et al. |
| 2009/0285101 A1 | 11/2009 | Lu |
| 2009/0285208 A1 | 11/2009 | Lu |
| 2009/0290588 A1 | 11/2009 | Kawahigashi |

(Continued)

FOREIGN PATENT DOCUMENTS

WO  WO 2005/047923  5/2005

OTHER PUBLICATIONS

"Virtual Bridged Local Area Networks—Amendment 8: Shortest Path Bridging", *IEEE P802.1aq/D2.5*; Jan. 6, 2010; 210 pages.

(Continued)

*Primary Examiner* — Kevin C Harper
*Assistant Examiner* — Derrick V Rose
(74) *Attorney, Agent, or Firm* — Nicholson De Vos Webster & Elliott, LLP

(57) ABSTRACT

A method in a network element is provided for improved convergence in a network that includes the network element. The network element is one of a plurality of network elements in the network each of which implement the method. The network element includes a database to store the topology of the network. The topology of the network includes a plurality of network elements and links between the network elements. The method classifies convergence actions for the network element to identify convergence actions that can be implemented prior to complete digest synchronization during a convergence process to simplify and reduce convergence latency once digest synchronization is achieved.

18 Claims, 5 Drawing Sheets

(56) References Cited

U.S. PATENT DOCUMENTS

| | | |
|---|---|---|
| 2009/0323687 A1 | 12/2009 | Nishimura |
| 2010/0157821 A1 | 6/2010 | Morris |
| 2010/0232316 A1 | 9/2010 | Takacs |
| 2011/0194404 A1 | 8/2011 | Kluger et al. |
| 2012/0057466 A1 | 3/2012 | Allan |
| 2012/0120803 A1 | 5/2012 | Farkas et al. |

OTHER PUBLICATIONS

Non-Final Office Action, U.S. Appl. No. 12/877,830, dated Dec. 27, 2012, 8 pages.

Non-Final Office Action, U.S. Appl. No. 12/877,826, dated Dec. 31, 2012, 9 pages.

Notice of Allowance, U.S. Appl. No. 12/877,826, dated Jul. 11, 2013, 12 pages.

Notice of Allowance, U.S. Appl. No. 12/877,830, dated Jul. 26, 2013, 12 pages.

"Media Access Control (MAC) Bridges and Virtual Bridged Local Area Networks—Amendment 20: Shortest Path Bridging", *IEEE Std 802.1aq*—Jun. 29, 2012; 340 pages.

Allan, David I., et al., U.S. Appl. No. 14/016,976, filed Sep. 3, 2013, 57 pages.

Allan, David I., et al., U.S. Appl. No. 13/757,532, filed Feb. 1, 2013, 36 pages.

Allan, David , "802.1aq Shortest Path Bridging Design and Evolution: The Architect's Perspective", *Chapter 1: IEEE 802.1 aq in a Nutshell: Antecedents and Technology; Wiley Press 2012*, Chapter 1, pp. 1-35.

Allan, David , et al., "Intelligent Load Balancing for Shortest Path Bridging", *IEEE Communications Magazine*; Jul. 2012; pp. 163-167.

Fedyk, D. , et al., "IS-IS Extensions Supporting IEEE 802.1 aq Shortest Path Bridging", *Internet Engineering Task Force (IETF); Standards track*; Apr. 2012; p. 1-37.

Seaman, Mick, "Agreement Protocol"; 802.1 aq, Revision 2.0, Sep. 7, 2010; 10 pages.

MULTICAST CONVERGENCE

FIELD OF THE INVENTION

The embodiments of the invention relate to a method and apparatus for improving convergence times in a network. Specifically, the embodiments of the invention relate to a method for improving convergence times by updating some network state by nodes in the network in advance of node synchronization, such as digest exchange, with the neighbors of these nodes and then using node synchronization to coordinate critical convergence steps.

BACKGROUND

Network convergence is a process whereby a set of networking devices exchange network topology information to establish a synchronized view of the current network topology for the network and both compute and install the corresponding forwarding state. A routing protocol and or a set of discovery protocols are utilized by the set of networking devices to exchange topology information. The state of network convergence is achieved once all topology information has been distributed to all of the network devices in the network and the corresponding forwarding state installed.

A network convergence time is a measure of how fast the overall set of network elements in a given network is able to collectively reach the state of network convergence. When a topology change has occurred, such as the failure of a link or node, data traffic may be disrupted for the duration of the network convergence time that may result in loss or delay in packet forwarding or similar operations until a new state of network convergence is reached, therefore it is desirable to minimize convergence time.

Similarly, service convergence is a state of a set of networking devices that support services for which a component of the service is the exchange of data via multicast forwarding. Thus, each service can be associated with one or more multicast distribution trees that define the forwarding of multicast data traffic associated with a given service. When the network resource model changes, or the set of subscribing nodes for a service is altered, or the resource requirements of a service instance are changed, the service convergence state is lost and must be recalculated. The time for re-establishing the service convergence state is the service convergence time. During the re-establishing of the service convergence state data traffic for the impacted services may be disrupted. The overall time required to perform service convergence in the absence of any network topology changes may be relaxed as it is not necessarily service impacting, and the service convergence process can be performed in a more controlled fashion than network convergence.

SUMMARY

A method in a network element is provided for improved convergence in a network that includes the network element. The network element is one of a plurality of network elements in the network each of which implement the method. The network element includes a database to store the topology of the network. The topology of the network includes a plurality of network elements and links between the network elements. The method classifies convergence actions for the network element to identify convergence actions that can be implemented prior to complete digest synchronization during a convergence process to simplify and reduce convergence latency once digest synchronization is achieved. The method includes the steps of receiving notification of a change in the network and identifying at least one multicast distribution tree affected by the change in the network. The at least one multicast distribution tree is computed based on the change in the network. A set of convergence actions is determined for the at least one multicast distribution tree based on a class type of the network element in relation to at least one multicast distribution tree. A class of convergence actions is implemented that can be safely completed before digest synchronization has completed. A digest exchange is initiated with neighboring network elements in the network to indicate readiness to perform synchronized state installation. A check is made whether the digest synchronization has completed. A class of convergence actions is implemented that require digest synchronization completion, in response to digest synchronization completion.

A network element is provided to implement a method for improved convergence in a network that includes the network element. The network element is one of a plurality of network elements in the network each of which implement the method. The network element includes a database to store the topology of the network. The topology of the network includes a plurality of network elements and links between the network elements. The method classifies convergence actions for the network element to identify convergence actions that can be implemented prior to completing digest synchronization during a convergence process to simplify and reduce the steps to be performed once digest synchronization is achieved. The network element includes a topology database configured to store link information for each link in the network, a forwarding database configured to store forwarding information for each port of the network element, wherein the forwarding database indicates where to forward traffic incoming to the network element, and a processor coupled to the topology database and the forwarding database, the processor configured to process data traffic. The processor executes a convergence optimization module. The convergence optimization module is configured to receive notification of a change in the network, to identify at least one multicast distribution tree affected by the change in the network, to compute the at least one multicast distribution tree based on the change in the network, to determine a set of convergence actions for the at least one multicast distribution tree based on a class type of the network element in the at least one multicast distribution tree, to implement a class of convergence actions that can be safely completed before digest synchronization has completed, to initiate digest exchange with neighboring network elements in the network to indicate readiness to perform synchronized state installation, to check whether the digest synchronization has completed, and to implement a class of convergence actions that require digest synchronization completion, in response to digest synchronization completion.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION

Figure 1:
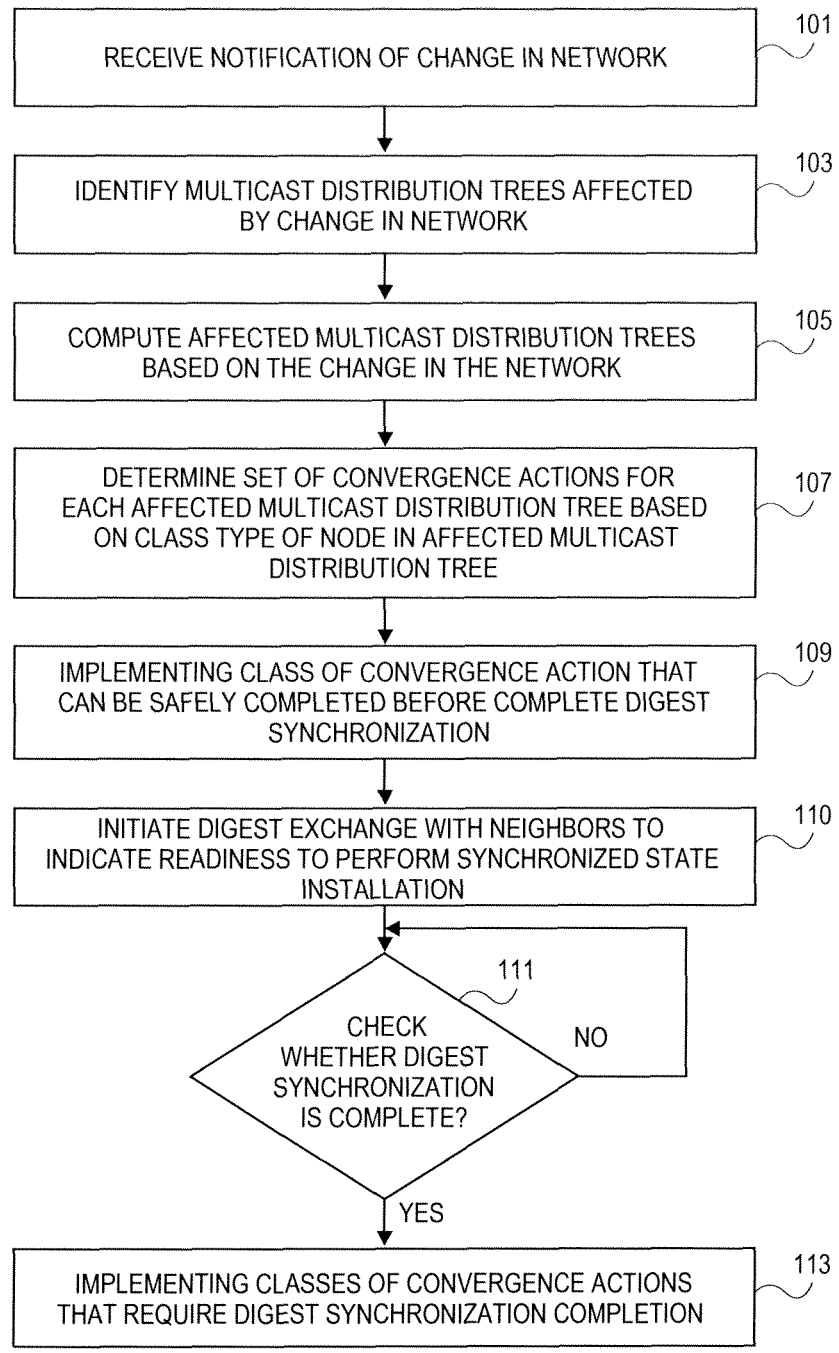
FIG. 1 is a flowchart of one embodiment of a process for convergence optimization.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

The operations of the flow diagrams will be described with reference to the exemplary embodiment of the figures. However, it should be understood that the operations of the flow diagrams can be performed by embodiments of the invention other than those discussed with reference to the figures, and the embodiments discussed with reference to the figures can perform operations different than those discussed with reference to the flow diagrams of the figures. Some of the figures provide example topologies and scenarios that illustrate the implementation of the principles and structures of the other figures.

The techniques shown in the figures can be implemented using code and data stored and executed on one or more electronic devices (e.g., an end station, a network element, etc.). Such electronic devices store and communicate (internally and/or with other electronic devices over a network) code and data using non-transitory machine-readable or computer-readable media, such as non-transitory machine-readable or computer-readable storage media (e.g., magnetic disks; optical disks; random access memory; read only memory; flash memory devices; and phase-change memory). In addition, such electronic devices typically include a set of one or more processors coupled to one or more other components, such as one or more storage devices, user input/output devices (e.g., a keyboard, a touch screen, and a display), and network connections. The coupling of the set of processors and other components is typically through one or more busses and bridges (also termed as bus controllers). The storage devices represent one or more non-transitory machine-readable or computer-readable storage media and non-transitory machine-readable or computer-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

As used herein, a network element (e.g., a router, switch, bridge, etc.) is a piece of networking equipment, including hardware and software, that communicatively interconnects other equipment on the network (e.g., other network elements, end stations, etc.). Some network elements are "multiple services network elements" that provide support for multiple networking functions (e.g., routing, bridging, switching, Layer 2 aggregation, session border control, multicasting, and/or subscriber management), and/or provide support for multiple application services (e.g., data, voice, and video). Subscriber end stations (e.g., servers, workstations, laptops, palm tops, mobile phones, smart phones, multimedia phones, Voice Over Internet Protocol (VOIP) phones, portable media players, GPS units, gaming systems, set-top boxes (STBs), etc.) access content/services provided over the Internet and/or content/services provided on virtual private networks (VPNs) overlaid on the Internet. The content and/or services are typically provided by one or more end stations (e.g., server end stations) belonging to a service or content provider or end stations participating in a peer to peer service, and may include public web pages (free content, store fronts, search services, etc.), private web pages (e.g., username/password accessed web pages providing email services, etc.), corporate networks over VPNs, IPTV, etc. Typically, subscriber end stations are coupled (e.g., through customer premise equipment coupled to an access network (wired or wirelessly) to edge network elements, which are coupled (e.g., through one or more core network elements to other edge network elements) to other end stations (e.g., server end stations).

As used herein, a packet network is designed to be interconnected by a plurality of sets of shortest path trees where each set offers full connectivity between all network elements in the network or between a specific subset of network elements that share attachment points to common service instances.

Connectivity service instances in the form of virtual networks are supported by the network and typically have service attachment points on some arbitrary subset of the of the network elements. These connectivity service instances are individually assigned to a specific shortest path tree set in the plurality of shortest path tree sets in the network, and utilize the necessary subset of the connectivity offered by the shortest path tree set to interconnect all service attachment points for that service instance.

Equal cost multi-path (ECMP) is a common strategy for load spreading of unicast traffic in routed networks that is utilized where the decision as to how to forward a packet to a given destination can resolve to any one of multiple "equal cost" paths, which have been determined to be tied for being the shortest path when running calculations on a topology database. ECMP can be used in conjunction with most unicast routing protocols and nodes equipped with the required supporting data plane hardware, since it relies on a per hop decision that is local to a single router and assumes promiscuous receipt and forwarding of frames combined with a complete forwarding table at every intermediate node. Using ECMP at any given node in a network, the load is divided pseudo-evenly across the set of equal cost next hops. This process is implemented independently at each hop of the network where more than one next hop to a given destination exists.

In many implementations, when the presence of multiple equal cost next hops is encountered, each packet is inspected for a source of entropy such as an Internet Protocol (IP) header and a hash of header information modulo the number of equal cost next hops is used to select the next hop on which to forward the particular packet. For highly aggregated traffic, this method will on average distribute the load evenly in regular topologies (i.e., symmetric topologies) and does offer some improvement in less regular topologies.

Ethernet and 802.1aq

The Institute of Electrical and Electronics Engineers (IEEE) 802.1aq standard for shortest path bridging (SPB) is used to construct full mesh shortest path connectivity in an Ethernet network architecture. SPB consolidates what normally is a number of control protocols into a single link state routing system supported by the intermediate system to intermediate system (IS-IS) protocol. This system is used for the computation of integrated and congruent unicast and multicast forwarding to construct Ethernet LAN connectivity.

802.1aq is an exemplar of a networking technology that can use edge based load assignment onto one of any number of set of trees and supports multiple connectivity service instances. As such the network can be meshed multiple times.

Ethernet network architectures including those supporting 802.1aq do not support per hop multi-path forwarding. This lack of support is a consequence of the need for congruence between unicast and multicast traffic and because multicast is not compatible with ECMP. Instead, multi-path solutions are implemented by instantiating a separate VLAN for each path permutation and assigning to each of the VLANs a portion of the load at the ingress to the Ethernet network. In the current 802.1aq specification, path permutations are generated via shortest path computation combined with the algorithmic manipulation of the node identifiers which are used for tie-breaking between the equal cost paths. The standardized algorithmic manipulation of node identifiers produces pseudo-random path selection and requires a significant dilation factor (needed to create more virtual paths than there are actual physical paths through the network) in order to even out the link utilization. Overall performance of the current multi-path solution is similar to ECMP.

MPLS

Multiprotocol label switching (MPLS) is a combination of a data plane and control plane technology utilized to forward traffic over a network. MPLS uses per hop labels that are assigned to a stream of traffic to forward the traffic across the network using label lookup and translation (referred to as "swapping"). Each node of the network supports MPLS by reviewing incoming traffic received over the network and forwarding that traffic based on its label, the label is typically translated or "swapped" at each hop.

MPLS networks can improve the distribution of routed traffic in the network using per hop ECMP to distribute or spread a load across equal cost paths. In MPLS networks, a label switch path (LSP) is set up to each next hop for each equal cost path by every node in the network. The forwarding path for a given destination in the network is calculated using a shortest path first (SPF) algorithm at each node in the network, mapped to the local label bindings in the node, and the resultant connectivity appears as a multi-point to multi-point mesh. Individual nodes when presented with traffic destined for multiple equal costs paths utilize payload information as part of the path selection mechanism in order to maximize the evenness of flow distribution across the set of paths. The establishment of the multi-point to multi-point LSP is automated.

The label distribution protocol (LDP) or similar protocol is used to overprovision a complete set of label bindings for all possible forwarding equivalence classes in the network, and then each label switch router (LSR) independently computes the set of next hops for each forwarding equivalence class and selects which label bindings it will actually use at any given moment. MPLS does not have a data plane construct analogous to the Ethernet VLAN. However, as described in U.S. patent application Ser. No. 12/877,826, this notion can be encoded in the control plane such that MPLS can also have a mode of operation analogous to multi-tree instead of ECMP.

Basic Load Distribution Process Tie-Breaking

The basic load distribution process for the creation of forwarding trees standardized in 802.1aq and applicable to MPLS utilizes a tie-breaking process with distinct properties such that given a set of paths between any two points it will resolve to a single symmetric path regardless of the direction of computing, order of computing or examination of any subset of the path, a property described as "any portion of the shortest path is also the shortest path." Or stated another way, where a tie occurs along any portion of the shortest path, those nodes will resolve the tie for the subset of the path with the same choice as all nodes examining any other arbitrary subset of the path, the result being a minimum cost shortest path tree. This is referred to herein as the "common algorithm tie-breaking" process. Algebraic manipulation of the inputs into the tie breaking process is used to generate topological variability between the individual sets of trees so computed. Other approaches including U.S. patent application Ser. Nos. 12/877,826 and 14/016,976 consider additional topological or network resource metrics as inputs to the tie breaking process, and the principles and process discussed herein are applicable to these processes.

In the basic routing process, some network event will trigger a recomputation of the forwarding tables in the network in order to reconverge the network. This may be in response to a failure of a node or link, addition of components to the network, or some modification to the set of service instances supported by the network. The triggering of recomputation results in an initial pass of the topology database using the link metrics for shortest path determination and utilizing the common algorithm tie-breaking process which results in the generation of the first set of one or more congruent and symmetric trees whereby each will fully mesh all network elements in the network. This in many ways is nearly equivalent to applying bandwidth aware path selection to an unloaded network as no load on any link has been placed; hence, all equal cost/equal capacity paths will be tied for utilization where the definition of equal cost is the lowest metric combined with the lowest number of hops. The initial step requires the determination of the lowest cost paths between each of the node pairs in the network where lowest cost indicates the lowest metrics (i.e., cost in terms of latency or similar end to end (e2e) metric) and where more than one lowest cost path between any two nodes is found (i.e., multiple paths with the same metric), then the number of hops (i.e., shortest physical path) is utilized as an initial tie breaker. If there remains a tie between paths with the lowest metric and the lowest number of hops, then the common algorithm tie-breaking process is utilized in order to generate a unique path selection between each of the node pairs in the network and to ultimately generate a mesh of equal cost forwarding trees, termed an "ECT set" in Institute of Electrical and Electronics Engineers (IEEE) standard 802.1aq and as used herein.

802.1aq uses a digest exchange mechanism for loop avoidance. When an update to the routing database occurs, a node determines which MDTs are considered unsafe based on a criteria of changed distance to the root and removes state for those MDTs. Upon completion of this step a node will then exchange a cryptographically generated digest of topology elements in the routing database with its neighbors which advertises that it is safe to update multicast state for that adjacency for that database. When nodes agree on a digest value, implying they agree on the state of the network, then they may proceed to update multicast entries in the forwarding database. This is combined with a loop mitigation mechanism in the form of a reverse path forwarding check in which a node will only accept traffic for a given MDT on a single interface. The combination of loop avoidance and loop mitigation is considered to provide a comprehensive solution to preventing forwarding loops during the network convergence process.

Overview

The embodiments of the present invention provide a system, network and method for avoiding the disadvantages of the prior art on multicast trees that are independently computed by nodes utilizing a distributed routing system where the placement process for multicast trees may include iterative computation that considers the available resource model in the network, including adding, moving or otherwise changing participating nodes in one ECT set can have a cascading effect on paths in ECT sets that were subsequently calculated in a computation sequence such as that described with regard to the load distribution and tie-breaking process associated with 802.1aq. The method assumes there isn't any signaling protocol that enables a 'make before break' or similar preemptive setting up of multicast distribution trees. As a result, adding, moving or otherwise changing participating nodes in an ECT set or the resource model considered by ECT set computation can result in interruptions to the associated service and the subscribing nodes of that service. Similarly changes to the topology can cause disruptions in service for which the technique may mitigate the disruption.

However, when a change to a service occurs it is not tied to a change in the underlying network topology, but may modify the available resource model for the network triggering modification to the placement of existing MDTs. Thus, the distance to any and all roots of the multicast distribution trees (MDTs) associated with that service do not change. Further, in the absence of a topology change, the existing MDTs associated in the network are not considered 'unsafe' and can be left intact until pairwise digest exchange occurs and the nodes of the MDTs start updating the multicast forwarding entries as part of the service convergence process. In many embodiments, rearranging unicast paths is hitless and multicast loop mitigation is based on a reverse path forwarding check (RPFC) making multicast connectivity a logical 'AND' of all nodes of the service having synchronized forwarding databases from the root of the MDT to each leaf.

The embodiments are applicable to multiple scenarios including where "all backbone bridges" multicast (using a default I-SID) is used for at least service change notifications in IS-IS. The additions and deletions are typically made in the form of shortest path bridging media access code (MAC)-service identifiers (SPBM-SI) and unicast address sub-TLV additions and deletions from the IS-IS database. Thus, all network elements will receive a notification of a service change at close to the same time for a converged network as the MDTs for the default I-SID will be complete.

The embodiments of the invention overcome these disadvantages by using a process that reduces risk and employs a reliable strategy to minimize the number of nodes between the root and the leaf that need to simultaneously change state during convergence. Service related routing database elements are distinct from topology elements, the two classes of network convergence can be distinctly identified and procedures uniquely associated with each type of convergence.

The process identifies a number of classes of nodal behaviors for those nodes that need to take action during a change to multicast distribution tree configuration and applies rules to when the classes of behavior can be applied depending on the convergence type. When contrasting the current state and the desired future state of MDT configuration a node is able to determine its role with regard to each MDT. A first class (class 1) of nodes are identified that have no state for a given MDT and need to add state or nodes that already have state but can relax RPFC. A second class (class 2) of nodes are identified that will change the set of leaf ports for a given MDT. A third class (class 3) of nodes are identified that will change the root port for a given MDT. Finally, a fourth class (class 4) of nodes is identified that will remove all state with regard to a given MDT. Nodes that need to do nothing with respect to a given MDT are excluded from this classification as a convenience as there are no associated convergence actions.

Using this classification of the nodes, the nodes in class 2 and class 3 need to have their changes as closely synchronized as possible, the nodes in class 1 can perform their changes in loosely synchronized manner prior to the changes for class 2 and class 3 nodes, and the nodes in class 4 can perform their changes in a loosely synchronized manner after class 2 and class 3 nodes have completed their changes.

The only nodes that can relax RPFC without a risk of packet duplication are nodes where all class 2 type changes associated with the root port change will be performed by a single node, so synchronization of multiple nodes is not required. This actually needs to be the logical 'AND' of the nodes relationship to all multicast distribution trees that are going to change in this ECT set to be truly robust when RPFC control is at the granularity of ECT set, otherwise relaxing RPFC for one multicast distribution tree, could result in duplication in another. When RPFC is at the granularity of port or node, it has to be the logical 'AND' of the node's relationship to all multicast trees that are going to change.

Even with the process set forth herein, a mechanism of global synchronization still does not exist so the process is dependent on local synchronization in the form of digest exchange, also referred to as 'agreements' to produce a relative improvement in the quality of simultaneous synchronization being achieved. Agreements are not directional, for example, it is not possible to make an agreement with one node contingent on having an agreement with another node in the network and if this were true the network would be more "brittle" in its recovery behavior. When the technique is applied to 802.1aq the embodiments slightly change the semantics of the meaning of digest exchange beyond that envisioned in the standard. The conventional digest exchange between adjacent nodes in a network is understood to be in regard to network convergence, for database with digest "x", the node offering a digest value has removed state for all unsafe multicast distribution trees, those whose distance to the root has changed by an unsafe amount, and if there was no topology change it simply indicates that the nodes has a topology database described by digest "x" and that all Class 1 actions have been performed.

To networking approaches that use this conventional digest exchange, the embodiments add the semantic for service convergence, for those that previously did not have a digest exchange, this step is added (but may be in the form of some other pairwise synchronization exchange, a database digest still being a preferred form). Digest exchange and synchronization is provided by way of example, however, one skilled in the art would understand that convergence can employ other types of node synchronization in the form of any type of handshake or similar protocol for exchange of information between nodes that enables the nodes to share common view of the network or services. In this case if there was no topology change, the nodes indicate they have installed state for all multicast distribution trees for which the node is a class 1 node and the nodes have disabled RPFC for all ECT sets where they are the only leaf of an upstream node common to both the old and new MDTs and the node has determined all further actions to be performed to complete service convergence. Thus, when digest synch is achieved with all neighbors that are leaves, then for a class 2 node in a given MDT can then update the set of leaves for the MDT. When digest synchronization is achieved with a new root for a given MDT for a class 3 node, that node can update its root. When digest synchronization is achieved with all neighbors a class 4 node can then remove state (optionally with a modest delay). When digest synchronization is achieved with all neighbors, then a class 1 node for a given MDT can turn RPFC back on (in some embodiments with a modest delay to allow for non-synchronization with the upstream class 2 node).

The conventional digest exchange was predicated on the notion that a single Dijkstra algorithm calculation would be sufficient to determine unsafe multicast distribution trees, which could be discarded, and digest exchange would occur in parallel while the all-pairs computation for multicast distribution tree calculation was performed. By the time the computation was complete, digests would frequently be already synchronized between the nodes of the network. However, the computational load of a full "all pairs" computation would highlight differences in compute power between a heterogeneous set of nodal implementations. This would tend to make the distinction between local synchronization timing and network wide synchronization timing significant (i.e., there would a sizeable margin in these timings).

When utilization metrics are considered as an input to tree computation (for example, U.S. patent application Ser. No. 14/016,976), if as a result of network convergence, a node retains the individual ECT set metrics contributing to each links' available link bandwidth coefficient, then when an end point is added to or removed from an I-SID in an ECT set, only that I-SID's trees need to be computed for that ECT set in order to "adjust" the available link bandwidth coefficients, and only the load sources in subsequent ECT sets in the computation sequence would require re-computation. These computation will be less than the computation requirements for a full all pairs computation. This indicates that the potential "delta" between global synchronization and local synchronization may be approaching the natural "jitter" of any synchronization mechanism. In other words such synchronization can never be perfect, and there is a design choice between a simple mechanism and a complex one, where the actual result may not be distinguishable. The present embodiments capture such a simple mechanism. It would be understood by those skilled in the art, that this suggestion of continual recomputation is predicated on the notion that an implementation cannot retain the whole solution and intermediate products that was the output of the previous computation sequence due to high level of requisite resources. If the process could retain "all possible paths" state then there would simply be an exercise of tie breaking between equal cost paths. Currently, the preferred practice is to collapse state for each Dijkstra computation as the computation progresses so not all state is retained and the computation is optimized.

It is possible for a network topology change to occur in the middle of "service convergence," which for analysis with regard to this process will be considered to be the scenario where some or all class 1 nodes have completed their changes, but agreements have not universally been achieved. It should be noted that a service change received during network convergence will typically be ignored until network convergence completes or it will simply be treated as part of the network convergence process.

This is because when a network topology change notification is received, there is usually a small hold off timer applied before starting computation to collect all advertisements associated with the failure to avoid repeated re-convergence steps. However, such a hold off timer is not required for service convergence scenarios. To analyze this, portions of an MDT are considered to have completed service convergence and portions of the MDT will have not completed. This creates several possible scenarios, in one scenario no agreements may be reached on a candidate loop segment. In another scenario, agreements are reached for a portion of the candidate loop segment. In a further scenario, agreements are reached for all portions and service convergence is complete, so there is no possible race condition in this scenario.

Class 1, 2 and 3 nodes for a given multicast distribution tree need to consider any state installed for unsafe multicast distribution trees as unsafe state to be removed prior to any further digest exchange with adjacent nodes. State installed for what are considered to be "safe trees" may still be subsequently discarded, but in the interest of expediency of operations, the state of these safe trees can be left in place until after network convergence completes. The requirement for network convergence and associated loop prevention procedures trumps service convergence when they collide.

In certain scenarios it is possible that differences in computing power between nodes is sufficient that one node may complete all network convergence computation prior to achieving digest synchronization with adjacent nodes. In this case if the node is a class 1 node for a "safe tree" it can go ahead and install state for that tree prior to achieving digest synchronization. Performing this installation will accelerate convergence as it reduced the amount of state to be installed once digest synchronization has been achieved. It may also perform class 1 actions for safe trees as soon as they are determined.

When performing service convergence, the embodiments define nodal actions that can be taken prior to the set of actions that are service impacting to minimize the number of moving parts, i.e., independent actions to be performed, when the service impacting synchronization steps are performed. The set of actions is in the form of either installing state, relaxing loop mitigation filtering or similar synchronization related actions.

When performing network convergence, the embodiments define nodal actions that can be performed for "safe" multicast trees (i.e., a subset of class 1 which excludes RPFC) in advance of digest exchange, and simply perform these actions at the first opportunity instead of once digest synchronization has been achieved.

In one embodiment, the digest synchronization process can be overloaded to indicate not only that state for unsafe trees has been removed, but also that the loose or independent synchronization steps have been performed and the multicast distribution tree impacting state installation steps have been determined and can now be taken.

The embodiments provide advantages over the prior art including reducing the overall duration of service interruptions to multicast services when service changes or alterations in the network resource model result in a rearrangement of network paths. The embodiments also reduce service convergence time for topology changes as certain classes of nodes are identified that may install multicast state in advance of digest synchronization with their neighbors.

FIG. 1 is a flowchart of one embodiment of a process for convergence optimization. This embodiment of the process is abstracted to demonstrate that the general convergence process can improve convergence times for either service convergence or network convergence according to the principles and structures discussed herein below. The process improves the convergence time by optimizing the process via the identification of actions that can be performed in advance of the digest exchange and synchronization process thereby minimizing actions to be carried out during that process using a simple and reliable process.

In one embodiment, the process is initiated in response to receiving notification of a change in the network (Block 101), such as a change in nodes with relation to network topology or service participation. The process assumes a scenario where multicast distribution trees have previously been generated and that this generation was part of an interdependent computation sequence such that multicast distribution trees that were generated at a later point in the sequence had paths selected based at least in part on the resource consumption of earlier generated multicast distribution trees. For example, load distribution processes and tie-breaking with regard to ECT sets in 802.1aq implement such computation sequences.

The process then identifies the multicast distribution trees that are affected by the notified change (Block 103). The affected multicast distribution trees can simply be all multicast distribution trees in some cases of network topology changes, or a specific set of multicast trees dependent on a network resource model that has changed, an example being when a cascaded dependent set of trees is generated with resource constraints. The process can then determine a new set of multicast distribution trees to replace those that are affected using any multicast distribution tree calculation algorithm or similar process (Block 105).

Once the set of multicast distribution trees has been calculated, the process can then determine the set of convergence actions that are required to implement the changes to the state information in the forwarding database or similar databases for the node executing the process. The class type (according to the class definitions set forth above) of the node is determined for each of the affected multicast distribution trees (Block 107). This enables the execution of the convergence actions according to the associated class of the node, specifically the node can implement those convergence actions that are safe to be implemented for the class of the node before complete digest synchronization occurs (Block 109). Example embodiments are discussed herein below with regard to FIGS. 3 and 4 that demonstrate more specific implementation of the convergence actions depending on the scenario and the class identification of the node.

Once the node has determined all actions to be performed to instantiate the change to the network for service convergence, digest exchange is initiated (Block 110). A check can then be made whether the digest synchronization has completed (Block 111). The initiation and management of the digest synchronization can be part of the same module or process or it can be an independent process that the convergence optimization process monitors or receives information from. If the digest synchronization process has not completed, then the convergence optimization can continue to wait for the digest synchronization to complete. In one embodiment, additional 'safe' convergence actions can continue to be identified and implemented during this waiting period.

Upon completion of the digest synchronization, the classes of convergence actions that had been determined as required but not been completed due to their dependence on the digest synchronization process can now be performed.

Figure 2A:
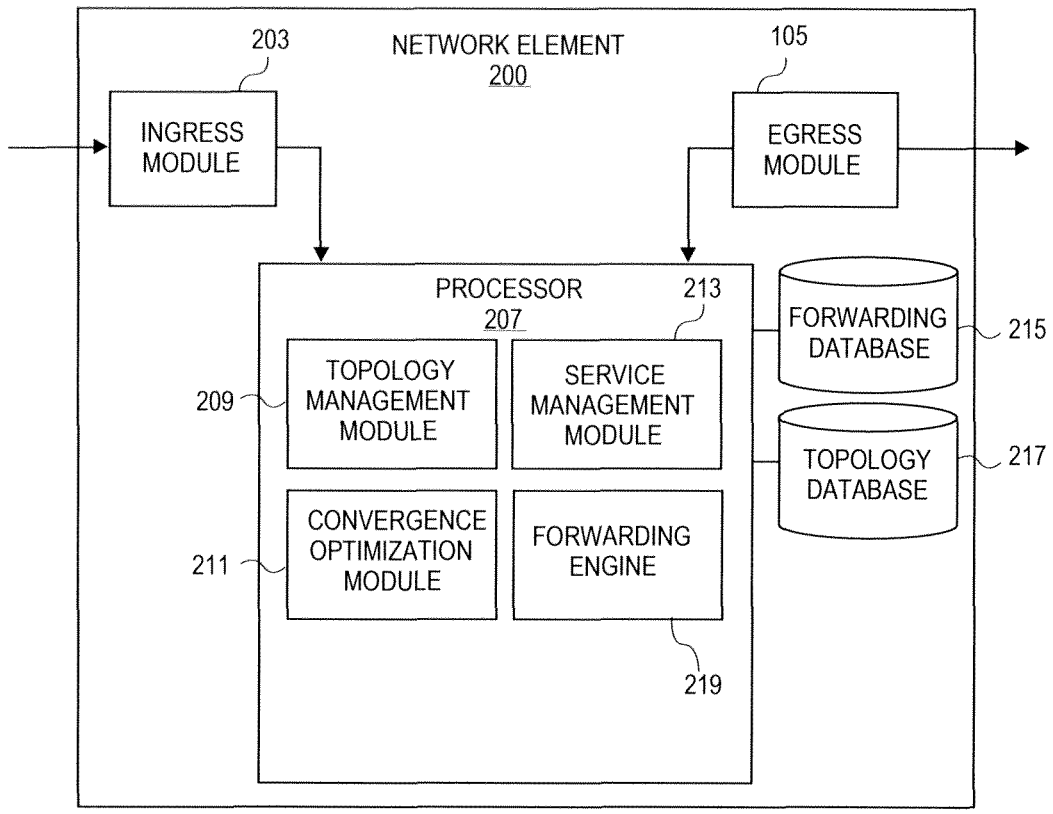
FIG. 2A is a diagram of one embodiment of a network element implementing a convergence optimization process.

FIG. 2A is a diagram of one embodiment of a network element implementing a convergence optimization process. In one embodiment, the network element 200 can include a forwarding database 215, a topology database 217, an ingress module 203, an egress module 205, a forwarding engine 219, a topology management module 209, a service management module 213, a convergence optimization module 211 and a processor 207. In other embodiments, such as an MPLS implementation other components such as a label information base, LDP module, MPLS management module and similar components can be implemented by the network element 200. The example embodiment of the network element can be an 802.1aq Ethernet bridge, however, one skilled in the art would understand that the principles, features and structures can be applied to other architectures such as a network element implementing MPLS.

The ingress module 203 can handle the processing of data packets being received by the network element 200 at the physical link and data link level. In one embodiment, this includes identifying IS-IS traffic destined for the processor 207. The egress module 205 handles the processing of data packets being transmitted by the network element 200 at the physical link and data link level. The processor 207 can execute the forwarding engine 219, the topology management module 209, service management module 213 and convergence optimization module 211.

The forwarding engine 219 handles the forwarding and higher level processing of the data traffic. The forwarding database 215 includes a forwarding table and forwarding entries that define the manner in which data packets are to be forwarded. Forwarding entries relate addresses to network interfaces of the network element 200. This information can be utilized by the forwarding engine 219 to determine how a data packet is to be handled, i.e., which network interface the data packet should be forward unto.

The topology database 217 stores a network model or similar representation of the topology of the network with which the network element 200 is connected. The topology database 217 includes identifiers for each of the nodes in the network as well as information on each of the links between the nodes. In one embodiment, the nodes in the network are each network elements (e.g., Ethernet bridges or similar devices) and the links between the network elements can be any communication medium (e.g., Ethernet links). The nodes (i.e., each network element) can be identified with unique node identifiers and the links with node-identifier pairs. One skilled in the art would understand that this network model representation is provided by way of example and that other representations of the network topology can be utilized with the load distribution method and system.

Further, as used herein the term 'node' or network node is an abstraction of a device implementing the data plane and or control plane for handling data traffic traversing a network. This device can be the network element 200 as shown in either FIG. 2A or 2B. Thus, one skilled in the art would understand that a 'node' is an abstraction utilized by the process described herein. However, the process is executed at a network element, which is a discrete device (e.g., a router or bridge) as illustrated.

A topology management module 209 is a component of the processor 207 or a module executed by the processor 207. The topology management module 209 communicates with adjacent network elements in the network and utilizes this information to maintain the topology database 217 that can be utilized to determine a set of paths or trees between any two or more nodes in the network topology. t A service management module 213 tracks the correlation between nodes in the network, multicast distribution trees, services and similar information including state information related to these elements. The state information can be maintained in the forwarding database 215 and/or the topology database 217. The service management module 213 can operate in conjunction with the convergence optimization module 211 to implement the convergence optimization process described herein.

The convergence optimization module 211 can implement the process as described herein above with regard to FIG. 1 as well as example embodiments illustrated in FIG. 3 and FIG. 4. The convergence optimization module can be configured to receive notification of changes in the network such as service or network topology changes that require service convergence or network convergence, respectively. The convergence optimization module 211 identifies multicast distribution trees affected by the change in the network, and computes replacement multicast distribution trees for these affected multicast distribution trees. The set of convergence actions for each affected multicast distribution tree can be determined based on the class of the node (i.e., the executing network element) in the affected multicast distribution tree. The class of convergence actions that can be safely completed before complete digest synchronization can then be performed. Once the digest synchronization has completed, then the remaining classes of convergence actions can be performed.

Figure 2B:
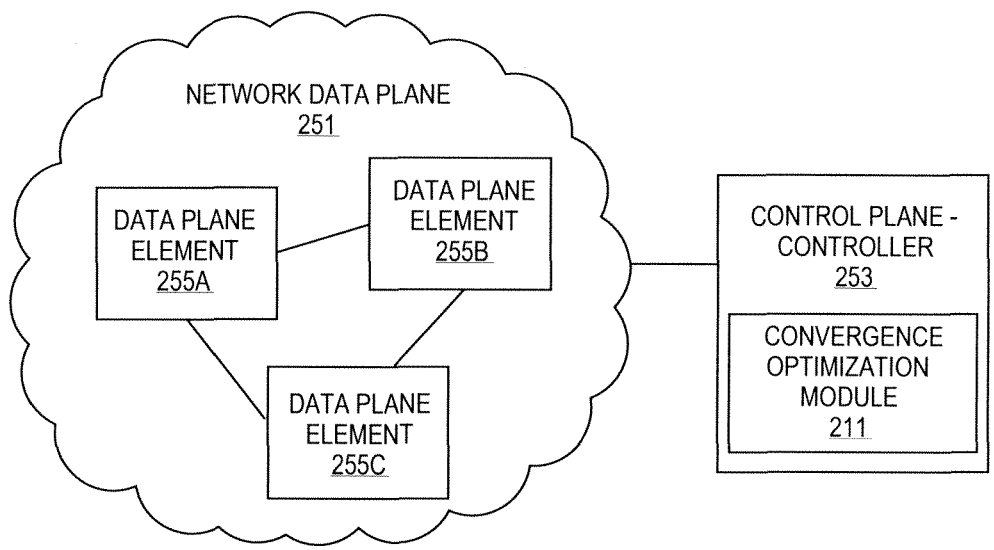
FIG. 2B is a diagram of another embodiment implementing the convergence optimization process.

In other embodiments, the functions for implementing the convergence optimization process are implemented by a processor implementing a control plane that is remote from a data plane or forwarding processor. The example illustration and architecture of FIG. 2A can be adapted to such a split architecture as illustrated in FIG. 2B. The topology management module 209, service management module 213 and convergence optimization module 211 can be executed by a processor 207 of a controller 253 that is remote from the network elements implementing the forwarding engine in a set of data plane elements 255A-C. The controller can be in communication with the data plane 251 via a flow control protocol, such as the OpenFlow protocol. The functions of the topology management module 209, service management module 213 and multicast distribution tree 211 can implement the same functionality as described in the illustrated architecture of FIG. 2A.

Figure 3:
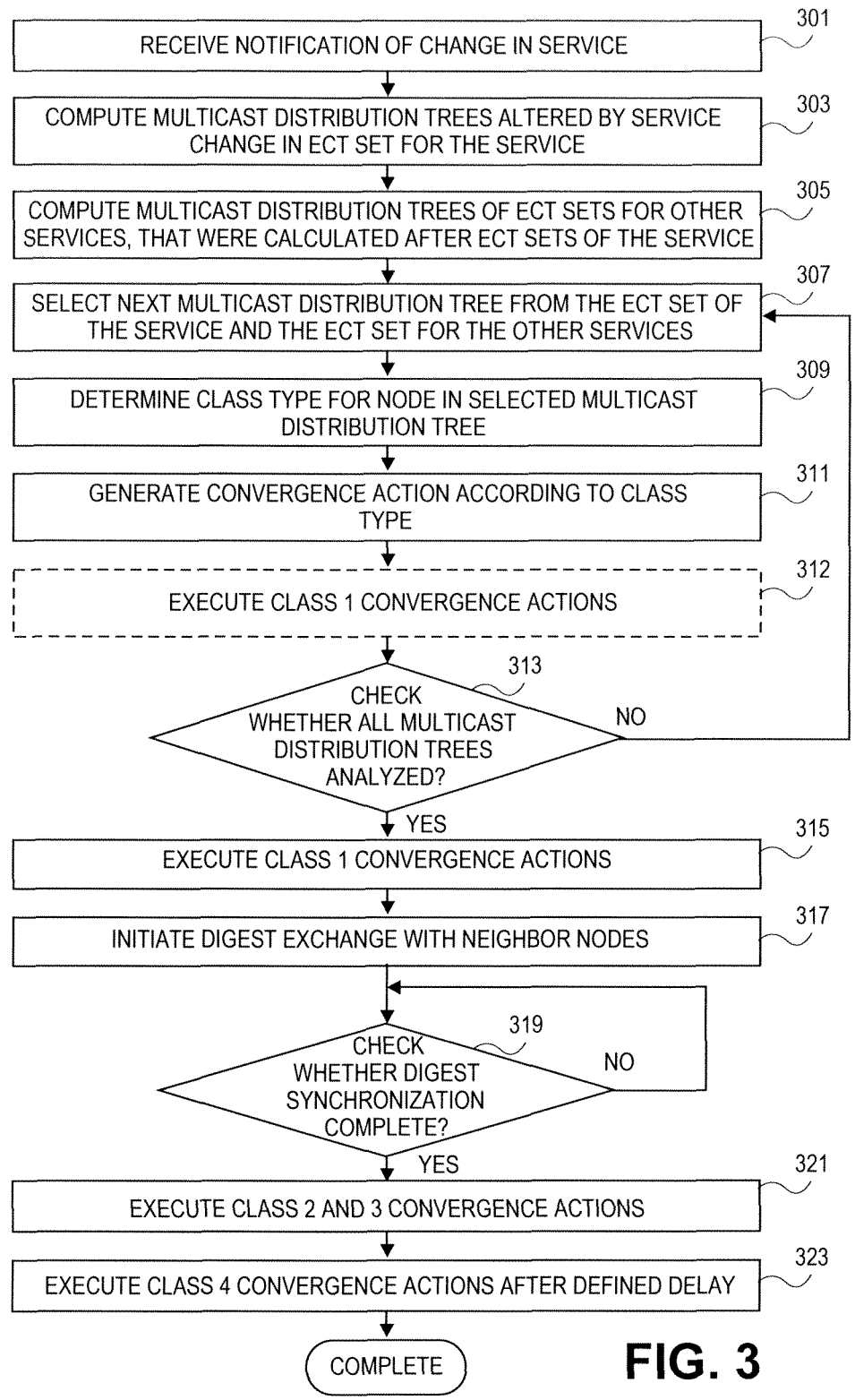
FIG. 3 is a flowchart of one embodiment of the process implemented for service convergence.

FIG. 3 is a flowchart of one embodiment of the process implemented for service convergence. This embodiment of the process is an example specific to service convergence. The process improves the service convergence time by optimizing the process via the identification of actions that can be performed in advance of the digest exchange and synchronization process thereby minimizing actions to be carried out during that process using a simple and reliable process.

In one embodiment, the process is initiated in response to receiving notification of a change in at least one service in the network (Block 301), such as a change in nodes with relation to service participation. The process assumes a scenario where multicast distribution trees have previously been generated and that this generation was part of an interdependent computation sequence such that multicast distribution trees that were generated at a later point in the sequence had paths selected based at least in part on considering the resources consumed by the earlier generated multicast distribution trees. For example, load distribution processes and tie-breaking with regard to ECT sets in 802.1aq implement such computation sequences. The notification of the service change can be received via any protocol or communication mechanism such that the addition, movement, or deletion of any number of nodes from a given service is specified.

The process then identifies and recomputes the multicast distribution trees that are affected by the notified service change in the ECT set for the identified service (Block 303). The affected multicast distribution trees can be those that include a nodal change such as a node that has been, removed, added or moved for a given service. The process can then determine a new set of multicast distribution trees to replace those that are affected using any multicast distribution tree calculation algorithm or similar process. Once the multicast distribution trees are recomputed that were directly affected by the service change, then the multicast distribution trees of ECT sets for other services that were calculated in the computation sequence after the directly affected services are recomputed (Block 305).

The process then begins to iterate through the set of recomputed multicast distribution trees to determine what associated convergence actions can be implemented before digest synchronization completes. This involves selecting a next recomputed multicast distribution tree from the ECT sets of services that were directly or indirectly affected by the service change (Block 307).

Once a recomputed multicast distribution trees has been selected, the process can then determine the set of convergence actions that are required to implement the changes to the state information in the forwarding database or similar databases for the node executing the process. The class type (according to the class definitions set forth above) of the node is determined for each of the affected multicast distribution trees (Block 309). The actual set of convergence actions can be generated or add to using any process or analysis of the recomputed multicast distribution tree to determine what changes to the state information need to be updated (Block 311). A check is then made whether all of the recomputed multicast distribution trees have been analyzed (Block 313). If all of the multicast distribution trees have not been processed, then the process continues to select a next multicast distribution tree until all of the recomputed multicast distribution trees have been processed and the associated convergence actions compiled.

This enables the execution of the convergence actions according to the associated class of the node, specifically the node can implement those convergence actions that are safe to be implemented for the class of the node before complete digest synchronization occurs, which in the case of service convergence is class 1 synchronization action (Block 315).

The digest exchange can be initiated (Block 317) via communication with adjoining nodes. A check can then be made whether the digest synchronization has completed (Block 319). The initiation and management of the digest synchronization can be part of the same module or process or it can be an independent process that the convergence optimization process monitors or receives information from. If the digest synchronization process has not completed, then the convergence optimization can continue to wait for the digest synchronization to complete. In one embodiment, additional 'safe' convergence actions (i.e., class 1 actions) can continue to be identified and implemented during this waiting period.

Upon completion of the digest synchronization, the classes of convergence actions that had not been completed (i.e., classes 2 and 3) due to their dependence on the digest synchronization process can now be performed. When processing the MDTs, the process generates a list of convergence actions. Optionally, the node can perform the class 1 convergence actions as soon as they are determined and added to the list (Block 312) rather than waiting to perform these convergence actions after all the MDTs have been processed (Block 315). The list of all convergence actions is expected to be complete prior to initiating digest exchange for service convergence.

In some embodiments, there are a set of convergence actions that further required the implementation of class 2 and 3 synchronization or a further delay to allow for the digest exchange completion. This class can include class 4 convergence actions (Block 323).

Figure 4:
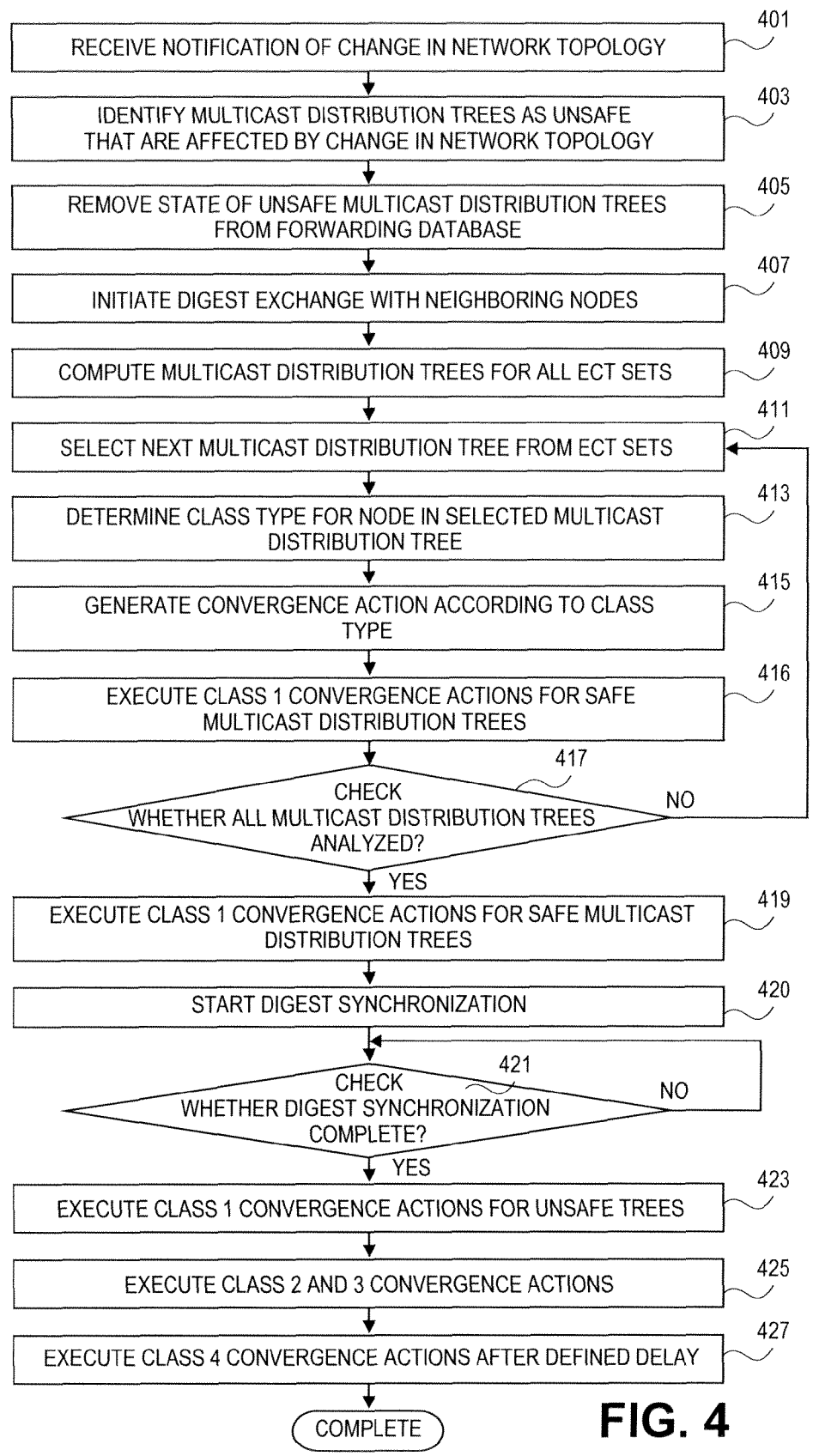
FIG. 4 is a flowchart of one embodiment of the process implemented for network convergence.

FIG. 4 is a flowchart of one embodiment of the process implemented for network convergence. This embodiment of the process is an example specific to network convergence. The process improves the network convergence time by optimizing the process via the identification of actions that can be performed in advance of the digest exchange and synchronization process thereby minimizing actions to be carried out during that process using a simple and reliable process.

In one embodiment, the process is initiated in response to receiving notification of a change in at least one node or link in the network topology (Block 401). The process assumes a scenario where multicast distribution trees have previously been generated and that this generation was part of an interdependent computation sequence such that multicast distribution trees that were generated at a later point in the sequence had paths selected based at least in part on the earlier generated multicast distribution trees. For example, load distribution processes and tie-breaking with regard to ECT sets in 802.1aq implement such computation sequences. The notification of the network topology change can be received via any protocol or communication mechanism such that the addition, movement, or deletion of any number of nodes or links in the network topology is specified.

The process then identifies those multicast distribution trees that are affected by the network topology change and are potential sources of a loop, and labels them as 'unsafe' (Block 403). An affected multicast distribution tree is here one that is directly affected by a change in a node or link that is a part of the multicast distribution tree which results in a significant change in distance to the root of the tree. The state of these unsafe multicast distribution trees is then removed from the forwarding database (Block 405).

The process then initiates the digest exchange with adjacent or neighboring nodes (Block 407), any discovery or routing protocol can be utilized for network topology sharing and routing. While the digest exchange is in operation, the process recomputes the multicast distribution trees for all ECT sets (Block 409). All multicast distribution trees are treated as being affected by changes in network topology. The recomputed multicast distribution trees can be determined using any multicast distribution tree calculation algorithm or similar process.

The process then begins to iterate through the set of recomputed multicast distribution trees to determine what associated convergence actions can be implemented before digest synchronization completes and accumulates a list of those that must be performed after. This involves selecting a next recomputed multicast distribution tree from the ECT sets (Block 411).

Once a recomputed multicast distribution trees has been selected, the node class type is determined for the selected multicast distribution tree (Block 413) and the process can then determine the set of convergence actions that are required to implement the changes to the state information in the forwarding database or similar databases for the node executing the process (Block 415). The actual set of convergence actions can be generated or add to using any process or analysis of the recomputed multicast distribution tree to determine what changes to the state information need to be updated. A check is then made whether all of the recomputed multicast distribution trees have been analyzed (Block 417). If all of the multicast distribution trees have not been processed, then the process continues to select a next multicast distribution tree until all of the recomputed multicast distribution trees have been processed and the associated convergence actions compiled.

This enables the execution of the convergence actions according to the associated class of the node, specifically the node can implement those convergence actions that are safe to be implemented for the class of the node before complete digest synchronization occurs, which in the case of network convergence is class 1 convergence actions associated with safe multicast distribution trees (Block 419). Optionally, the class 1 convergence actions can be performed as they are determined, e.g., as they are added to the list of convergence actions that is built during the multicast distribution tree computation (Block 416).

Once all MDTs have been processed that may be impacted by the change to the network for service convergence, digest synchronization is initiated (Block 420). A check can then be made whether the digest synchronization has completed (Block 421). The initiation and management of the digest synchronization can be part of the same module or process or it can be an independent process that the convergence optimization process monitors or receives information from. If the digest synchronization process has not completed, then the convergence optimization can continue to wait for the digest synchronization to complete. In one embodiment, additional 'safe' convergence actions (i.e., class 1 actions associated with safe trees) can continue to be identified and implemented during this waiting period.

Upon completion of the digest synchronization, the classes of convergence actions that had not been completed (i.e., class 1 actions for unsafe trees (Block 423) as well as all class 2 and 3 actions (Block 425) due to their dependence on the digest synchronization process can now be executed.

In some embodiments, there are a set of convergence actions that further required the implementation of a further delay to allow for completion of the performance of class 2 or 3 actions. This class can include class 4 convergence actions (Block 427).

Figure 5:
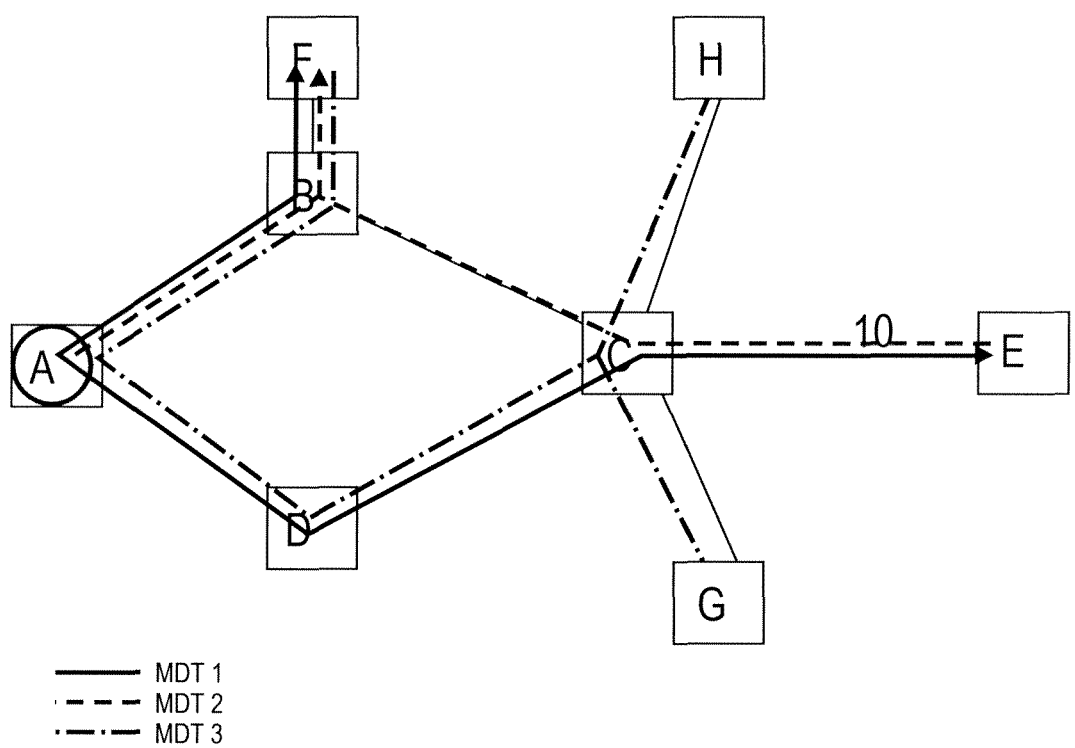
FIG. 5 is a diagram of one embodiment of a network and service topology.

FIG. 5 is a diagram of one embodiment of a network and service topology. The example topology demonstrates the difference between network topology and service topology. The nodes (e.g., a set of network elements such as routers or bridges) A-H are connected by a set of links illustrated with thin solid lines. A change in the links or nodes causes a network topology change requiring reestablishment of network convergence.

In contrast, the set of multicast distribution trees (MDT 1-3) are an overlay or operate over the network topology. Nodes and paths can be altered without any effect on the underlying network topology. However, assuming that the MDTs were generated in an interdependent sequence from 1-3, if there is a change to MDT 1, then the path selection for MDT 2 and MDT 3 can be indirectly affected. For example, where there were equal cost paths available to be utilized in MDT 2 or MDT 3 a tie-break may have been the load on the paths related to MDT 1, if MDT 1 changes this tie breaking process must be re-evaluated.

Thus, a method, system and apparatus for optimized convergence have been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method in a network element for improved convergence in a network that includes the network element, wherein the network element is one of a plurality of network elements in the network each of which implement the method, the network element includes a database to store the topology of the network, wherein the topology of the network includes a plurality of network elements and links between the network elements, the method to classify convergence actions for the network element to identify convergence actions that can be implemented prior to complete digest synchronization during a convergence process to simplify and reduce convergence latency once digest synchronization is achieved, the method comprising the steps of:

receiving notification of a change in the network;
identifying at least one multicast distribution tree affected by the change in the network;
computing the at least one multicast distribution tree based on the change in the network;
determining a set of convergence actions for the at least one multicast distribution tree based on a class type of the network element in relation to at least one multicast distribution tree;
implementing a class of convergence actions that can be safely completed before digest synchronization has completed;
initiating digest exchange with neighboring network elements in the network to indicate readiness to perform synchronized state installation; checking whether the digest synchronization has completed; and
implementing a class of convergence actions that require digest synchronization completion, in response to digest synchronization completion.

2. The method of claim 1, wherein receiving a notification of the change in the network further comprises:
receiving notification of a service change or a network topology change.

3. The method of claim 1, wherein determining the set of convergence actions for the at least one multicast distribution tree based on the class type of the network element in the at least one multicast distribution tree, further comprises the step of:
identifying a first class of node that requires addition of state for the at least one multicast distribution tree or that can relax reverse path forwarding checking.

4. The method of claim 1, wherein determining the set of convergence actions for the at least one multicast distribution tree based on the class type of the network element in the at least one multicast distribution tree, further comprises the step of:
identifying a second class of node that change a set of leaf ports for the at least one multicast distribution tree.

5. The method of claim 1, wherein determining the set of convergence actions for the at least one multicast distribution tree based on the class type of the network element in the at least one multicast distribution tree, further comprises the step of:
identifying a third class of node that change a root port for the at least one multicast distribution tree.

6. The method of claim 1, wherein determining the set of convergence actions for the at least one multicast distribution tree based on the class type of the network element in the at least one multicast distribution tree, further comprises the step of:
identifying a fourth class of node that removes all state with respect to the at least one multicast distribution tree.

7. The method of claim 1, further comprising the step of:
identifying the at least one multicast distribution tree as unsafe based on the change being a network topology change affecting the at least one multicast distribution tree; and
removing all state of the at least one multicast distribution trees identified as unsafe.

8. The method of claim 3, wherein implementing a class of convergence actions that can be safely completed before digest synchronization has completed; further comprises the step of:
implementing convergence actions for the first class before digest synchronization has completed.

9. The method of claim 8, wherein only convergence actions of the first class for the at least one multicast distribution tree that is safe are implemented.

10. A network element for improved convergence in a network that includes the network element, wherein the network element is one of a plurality of network elements in the network each of which implement the method, the network element includes a database to store the topology of the network, wherein the topology of the network includes a plurality of network elements and links between the network elements, the method to classify convergence actions for the network element to identify convergence actions that can be implemented prior to complete digest synchronization during a convergence process to simplify and reduce load during digest synchronization, the network element comprising:

a topology database configured to store link information for each link in the network,
a forwarding database configured to store forwarding information for each port of the network element, wherein the forwarding database indicates where to forward traffic incoming to the network element; and
a processor coupled to the topology database and the forwarding database, the processor configured to process data traffic, wherein the processor executes a convergence optimization module,
the convergence optimization module configured to receive notification of a change in the network, to identify at least one multicast distribution tree affected by the change in the network, to compute the at least one multicast distribution tree based on the change in the network, to determine a set of convergence actions for the at least one multicast distribution tree based on a class type of the network element in the at least one multicast distribution tree, to implement a class of convergence actions that can be safely completed before digest synchronization has completed, to initiate digest exchange with neighboring network elements in the network to indicate readiness to perform synchronized state installation, to check whether the digest synchronization has completed, and to implement a class of convergence actions that require digest synchronization completion, in response to digest synchronization completion.

11. The network element of claim 10, wherein the convergence optimization module is further configured to receive notification of a service change or a network topology change.

12. The network element of claim 10, wherein the convergence optimization module is further configured to identify a first class of node that requires addition of state for the at least one multicast distribution tree or that can relax reverse path forwarding checking.

13. The network element of claim 10, wherein the convergence optimization module is further configured to identify a second class of node that change a set of leaf ports for the at least one multicast distribution tree.

14. The network element of claim 10, wherein the convergence optimization module is further configured to identify a third class of node that change a root port for the at least one multicast distribution tree.

15. The network element of claim 10, wherein the convergence optimization module is further configured to identify a fourth class of node that removes all state with respect to the at least one multicast distribution tree.

16. The network element of claim 10, wherein the convergence optimization module is further configured to identify the at least one multicast distribution tree as unsafe based on the change being a network topology change affecting the at least one multicast distribution tree, and to remove all state of the at least one multicast distribution trees identified as unsafe.

17. The network element of claim 12, wherein the convergence optimization module is further configured to implement convergence actions for the first class before digest synchronization has completed.

18. The network element of claim 17, wherein only convergence actions of the first class for the at least one multicast distribution tree that is safe are implemented.

* * * * *

UNITED STATES PATENT AND TRADEMARK OFFICE
CERTIFICATE OF CORRECTION

| | | |
|---|---|---|
| PATENT NO. | : 9,166,887 B2 | Page 1 of 1 |
| APPLICATION NO. | : 14/141120 | |
| DATED | : October 20, 2015 | |
| INVENTOR(S) | : Allan et al. | |

It is certified that error appears in the above-identified patent and that said Letters Patent is hereby corrected as shown below:

Drawings

In Fig. 2A, Sheet 2 of 5, delete "105" and insert -- 205 --, therefor.

Specification

In Column 12, Line 61, delete "topology. t" and insert -- topology. --, therefor.

Signed and Sealed this
Eighth Day of March, 2016

Michelle K. Lee
*Director of the United States Patent and Trademark Office*